July 14, 1970   M. E. WINTERS   3,520,290
GRATE-SUPPORTING BRACKET FOR OUTDOOR GRILL
Filed July 25, 1968   4 Sheets-Sheet 1
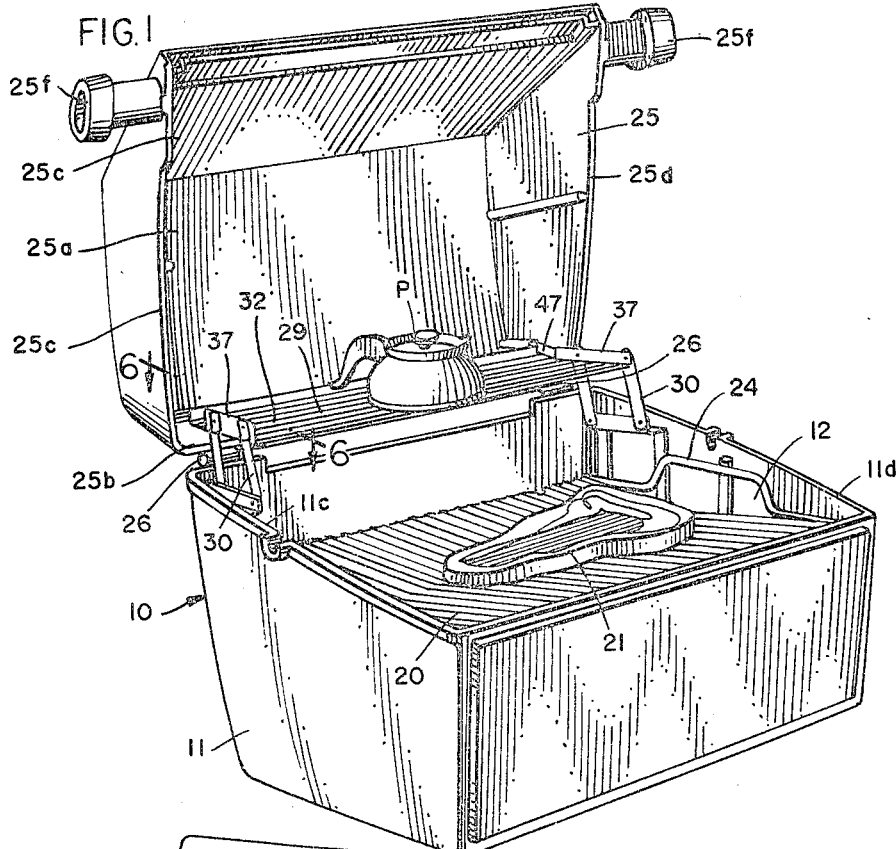
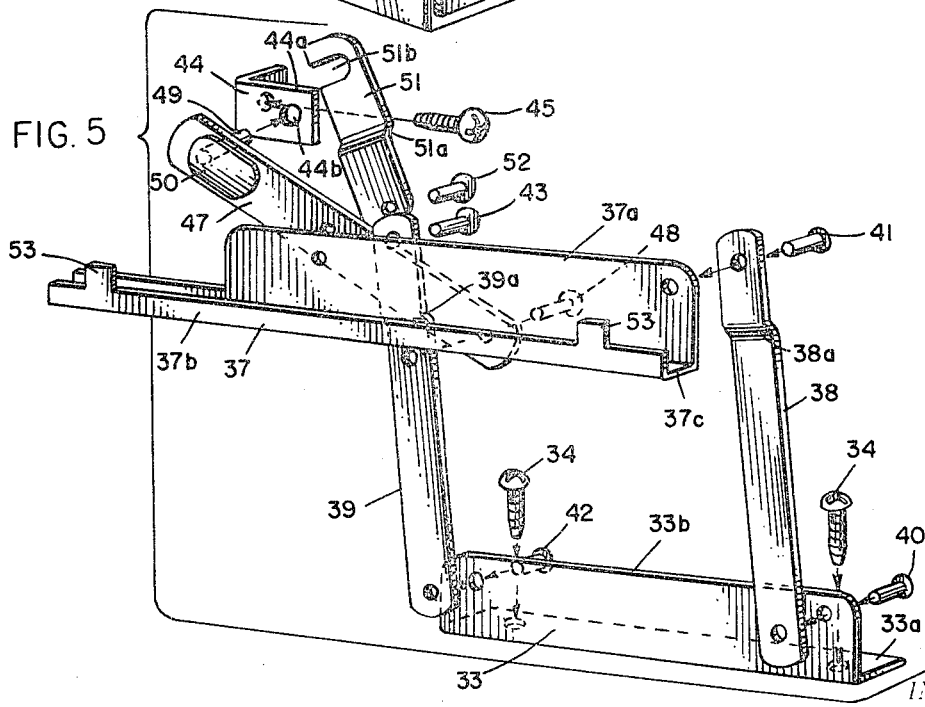
INVENTOR:
MELLIE E. WINTERS
BY
Dawson, Tilton, Fallon & Lungmus
ATT'YS July 14, 1970   M. E. WINTERS   3,520,290
GRATE-SUPPORTING BRACKET FOR OUTDOOR GRILL
Filed July 25, 1968   4 Sheets-Sheet 2
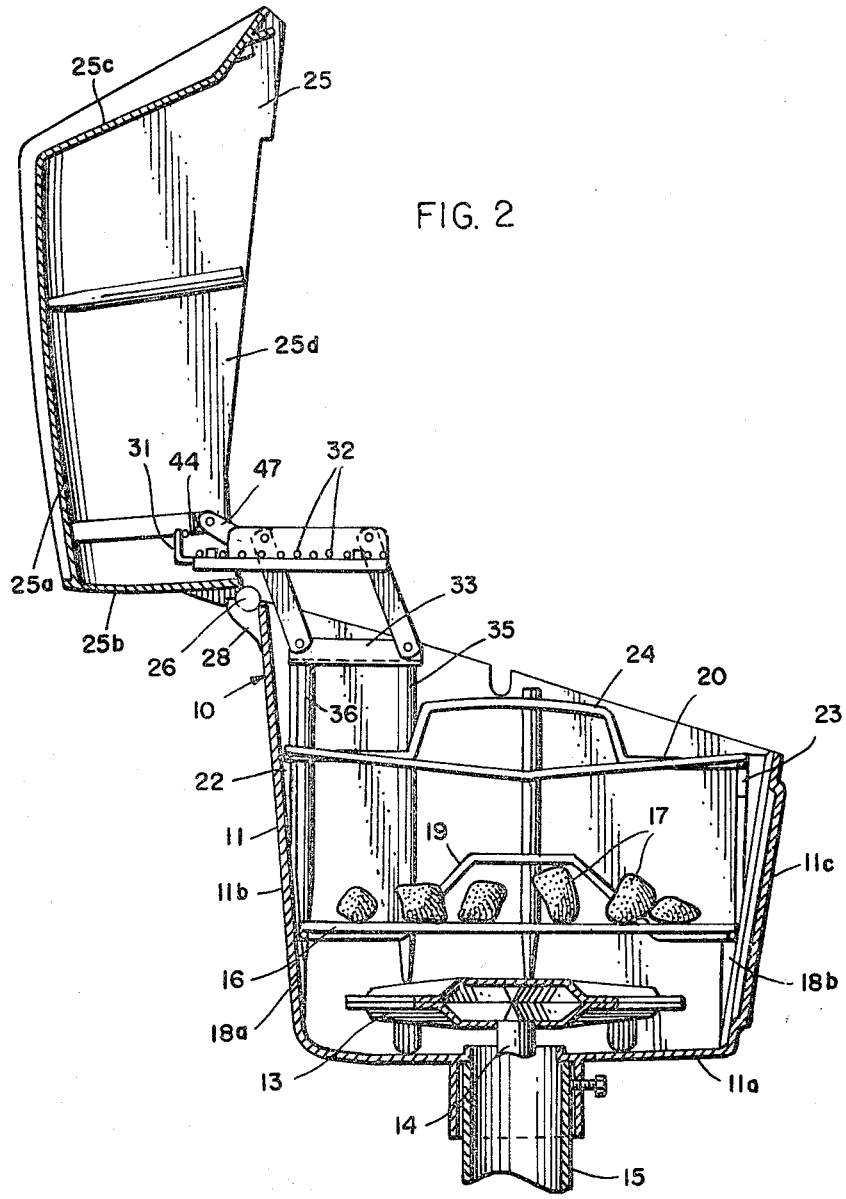
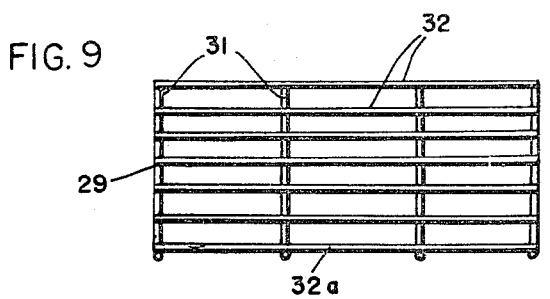
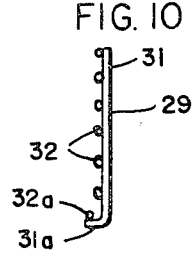
*INVENTOR:*
MELLIE E. WINTERS
*BY*
ATT'YS INVENTOR:
MELLIE E. WINTERS
BY
Dawson, Tilton, Falloy & Lungmus
ATT'YS

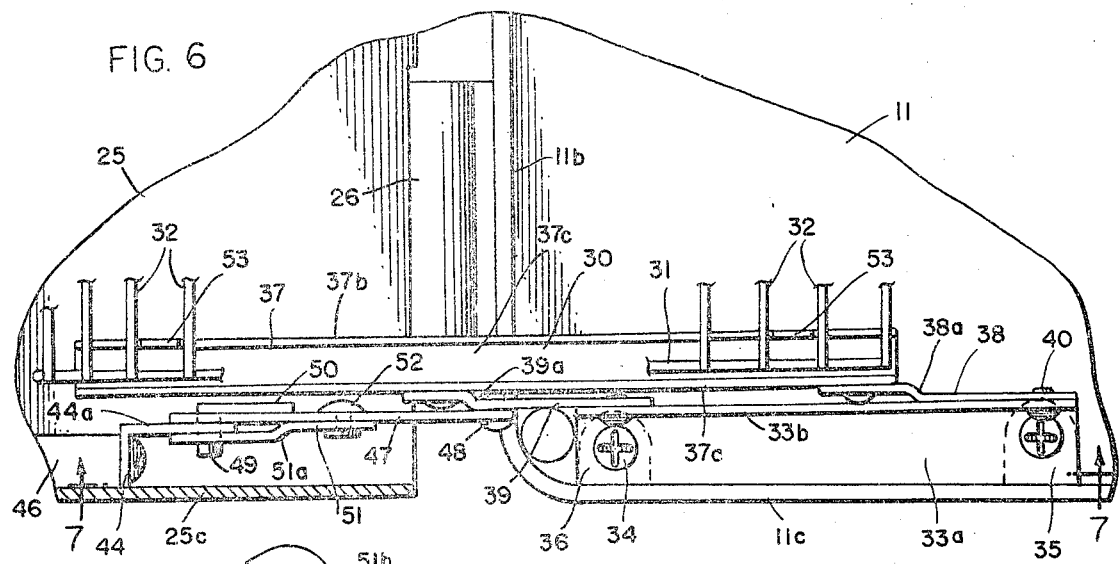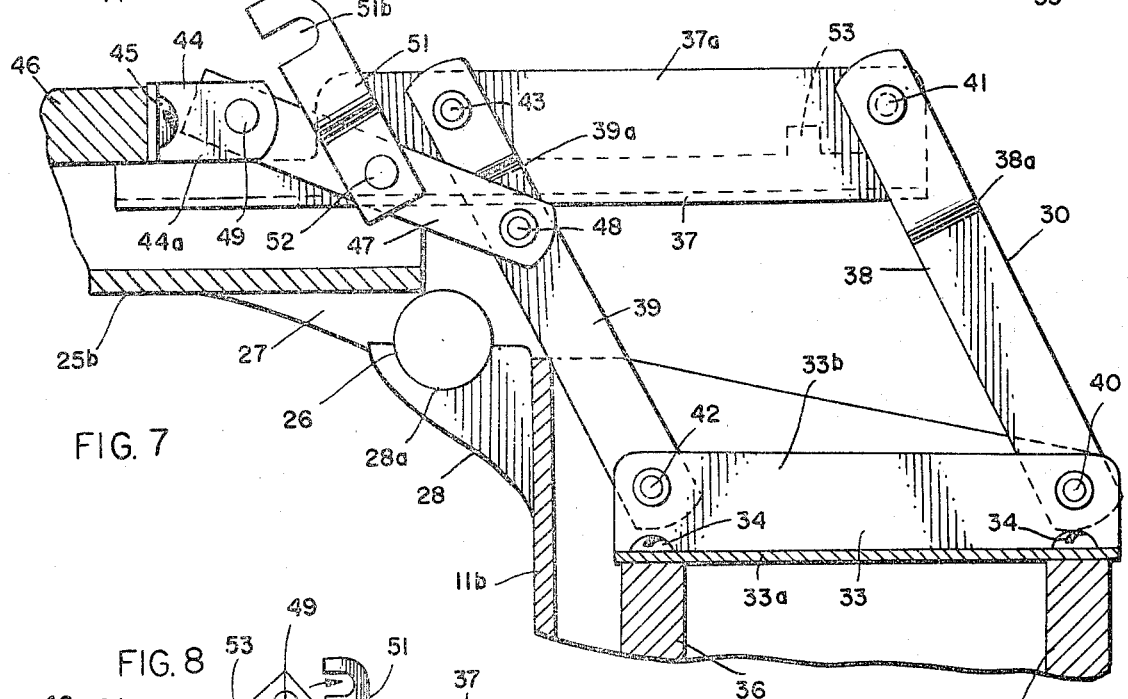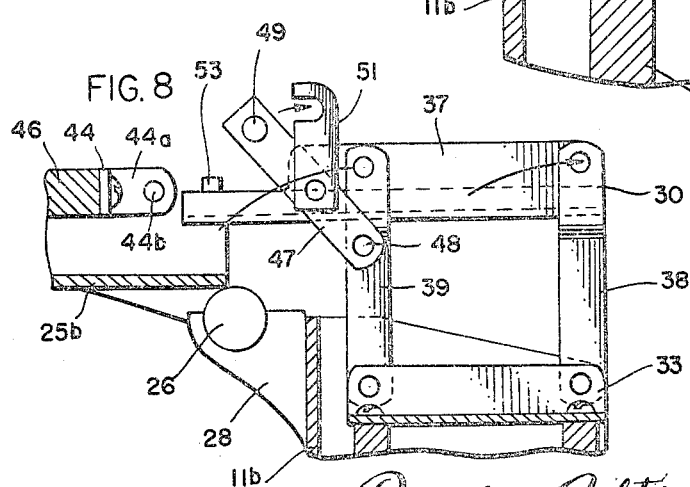

United States Patent Office 3,520,290
Patented July 14, 1970

3,520,290
GRATE-SUPPORTING BRACKET FOR
OUTDOOR GRILL
Mellie E. Winters, Wichita, Kans., assignor to The
Coleman Company, Inc., Wichita, Kans., a corporation of Kansas
Filed July 25, 1968, Ser. No. 747,662
Int. Cl. A47j 37/07; F24b 3/00
U.S. Cl. 126—25          7 Claims

ABSTRACT OF THE DISCLOSURE

A grate-supporting bracket for use with a covered outdoor grill is attached to the grill casing and grill cover and supports a warming grate or shelf. The bracket is pivotally secured to both the casing and the cover, and when the cover is closed the shelf is positioned over the heat source within the grill casing. As the cover is raised, the bracket swings the grate upwardly and away from heat source to provide access to the main cooking grate. The bracket includes a grate-supporting channel which is pivotally secured to a pair of parallel spaced-apart support legs which are also pivotally secured to a generally horizontally extending base secured to the casing. A guide arm is pivotally secured to one of the support legs and also pivotally secured to the cover, and as the cover is raised or lowered the grate-supporting channel is also raised or lowered with respect to the base while being maintained in a generally horizontal position by the support legs. The guide arm carries a pin which is inserted through an attaching bracket on the cover, and a latch pivotally secured to the guide arm engages the pin and prevents its withdrawal from the bracket unless the latch is first pivoted away from the pin.

BACKGROUND

This invention relates to outdoor cooking grills, and, more particularly, to a covered outdoor grill which cooks by means of charcoal or gas.

Outdoor grills generally include a casing which provides an enclosure for the heat source, generally lighted charcoal or a gas flame. A cooking grate is positioned within the enclosure above the heat source, and the grill may be provided with a cover or top which covers the enclosure while the food is cooking. It is frequently desirable to provide the grill with a second grate positioned above the main cooking grate, that is, farther away from the heat source, which may be used to hold food which is to be cooked at a slower rate or which is to be merely warmed. For example, if hamburgers are being cooked on the main grate, the cook may wish to place buns on the warming grate. If more food is to be cooked than can be conveniently positioned on the cooking grate, food can be removed to the warming grate as it becomes cooked, thereby providing room on the main grate for additional food.

Problems have arisen, however, with such warming grates. If the grate is supported by the grill casing, it may interfere with the ready access to the main grate which is desired when placing food on the main grate or when turning food from one side to the other. If the warming grate or compartment is provided in the cover, the grate may tilt when the cover is removed, and the food on the warming grate may slide and spill. Spilling is particularly troublesome with covers which are hingedly secured to the casing.

SUMMARY

The inventive bracket is pivotally secured to both the grill casing and the grill cover and always maintains the warming grate in a generally horizontal position. When the cover is raised, the warming grate is pivoted away from the main grate and food may readily be placed or turned on the main grate. When the cover is closed, the bracket automatically swings the warming grate toward the central portion of the grill enclosure to position the food to be warmed above the heat source. The bracket includes a grate-supporting channel which is pivotally secured to the upper ends of a pair of supporting legs, and the lower ends of the supporting legs are also pivotally supported so that the channel is always maintained in a generally horizontal position. The bracket is pivotally attached to the cover by a pin and latch construction, and the bracket may be readily disengaged from the cover by disengaging the latch from the pin.

THE DRAWINGS

The invention is shown in an illustrative embodiment in the accompanying drawing, in which:

FIG. 1 is a perspective view of an outdoor grill with the cover raised;

FIG. 2 is a side sectional view of the grill of FIG. 1;

FIG. 5 is an exploded perspective view of the bracket;

FIG. 6 is an enlarged top plan view of the bracket taken along the line 6—6 of FIG. 1;

FIG. 7 is a side view of the bracket taken along the line 7—7 of FIG. 6 showing the latch in the raised position;

FIG. 8 is a view similar to FIG. 7 showing the bracket being disengaged from the cover;

FIG. 9 is a top plan view of the warming grate; and

FIG. 10 is a side view of the grate of FIG. 9.

DESCRIPTION OF SPECIFIC EMBODIMENT

Figure 3:
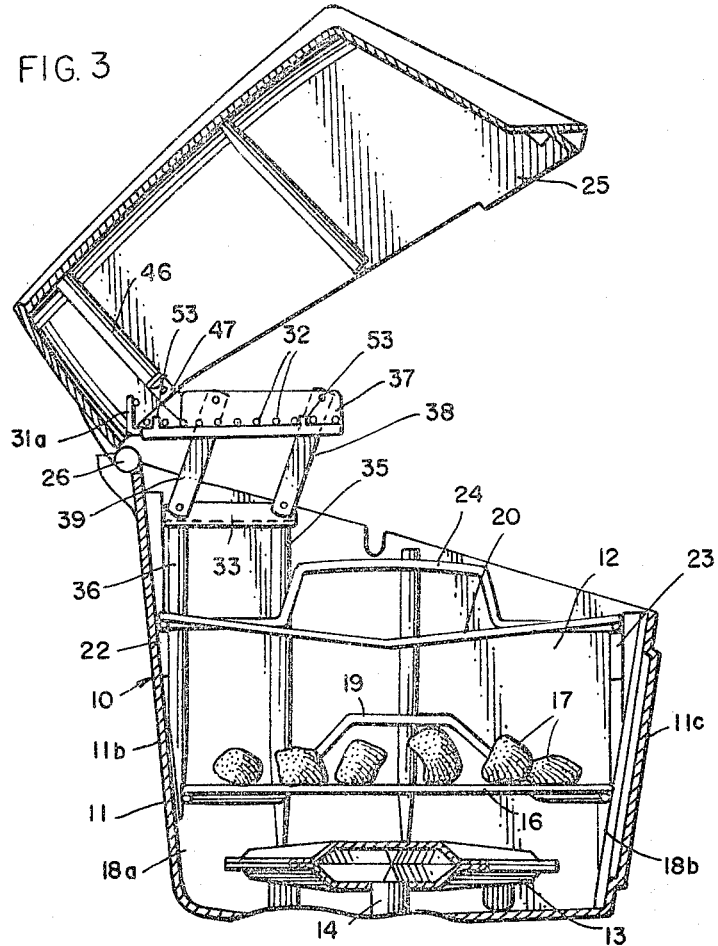
FIG. 3 is a sectional view similar to FIG. 2 showing the cover partially closed.

Referring to FIGS. 1–4, a grill 10 includes a casing 11 providing a horizontally and vertically extending cooking enclosure 12 accessible through a top opening. The enclosure 12 contains a heat source, which in the embodiment illustrated is a horizontally extending gas burner 13 which is mounted in the lower portion of the enclosed space. As shown most clearly in FIG. 2, the burner 13 is supported on a gas inlet pipe 14 which extends downwardly into a post 15 supportingly attached to the bottom wall 11a of the casing 11.

A grate 16 is mounted over the burner 13 for supporting non-combustible coals 17, such as ceramic briquets or porous volcanic rock. It is to be understood, however, that the invention may also be used with grills using other types of heating. For example, the gas burner 13 may be eliminated and combustible charcoal may be supported on the grate 16.

In the illustration given, grate 16 is formed of spaced rods and is supported on steps 18a and 18b, which can be formed integrally, respectively, with the casing rear wall 11b and casing front wall 11c. The casing may advantageously be made of die cast aluminum for this purpose. To facilitate removal of the grate for access to the burner 13 or for removal of briquets supported thereon, the ends of the grate can be provided with handles 19.

A cooking grate 20 is mounted in spaced relation above the grate 16 and the coals 17 for holding the food, such as steak 21, which is to be cooked. The grate 20 is supported on steps 22 and 23, being integrally formed, respectively, with rear wall 11b and front wall 11c. Grate 20 can also be equipped with handles 24 to facilitate its removal for cleaning or access to the lower portion of the enclosure 12. To minimize corrosion and facilitate cleaning, the grates 16 and 20 can be formed of corrosion-resistant metal, such as stainless steel or chrome-plated nickel.

A more detailed description of the casing 11, burner 13, and grates 16 and 20 can be found in the co-owned, co-pending application entitled Outdoor Gas Grill, Ser. No. 759,300, filed Sept. 12, 1968.

In the illustration given, the casing walls, including rear wall 11b, front wall 11c, and end walls 11d and 11e form a generally rectilinear casing, the walls extending upwardly with the end walls approximately at right angles to the front and rear walls, and the bottom 11a being disposed in a generally horizontal plane. It will be understood, however, that the invention is not limited to use with generally rectilinear grills, although this represents a preferred embodiment, and the invention may be used with grills having casings of oval, circular, and other cross-sectional shapes.

The grill includes a cover or top 25 which is also of generally rectilinear configuration and includes top wall 25a, rear wall 25b, front wall 25c, and end walls 25d and 25e. The cover 25 is hingedly supported on the casing 11 by a pair of pivot cylinders 26 which are connected to the rear wall 25b of the cover by webs 27 adjacent the end walls of the cover. The pivot cylinders 26 are rotatably supported by blocks 28 which extend outwardly from the rear wall 11b of the casing and which are provided with generally semi-cylindrical grooves 28a (FIG. 7). Suitable detents (not shown) are provided on the cover which engage the casing 11 and prevent the cover from pivoting away from the casing beyond the open position illustrated in FIGS. 1 and 2, in which the center of gravity of the cover is located outwardly or to the left of the pivots. It is to be understood that other hinged connections between the cover and the casing may be used, but the particular connection illustrated permits the cover to be readily disengaged from the casing when the cover is to be cleaned or replaced. Handles 25f may be attached to the cover to facilitate raising and lowering the cover.

Referring again to FIG. 1, a warming grate or shelf 29 is supported by a pair of grate-supporting brackets 30, and the grate supports a pot P of food to be warmed by the heat source. The grate may be a generally rectangular, planar wire grid as illustrated in FIG. 9, having a plurality of spaced-apart base rods 31 and a plurality of cross rods 32 secured to the tops of the base rods. The rear ends of the base rods 31 may be bent upwardly as at 31a to support a rear cross rod 32a to provide a back retaining wall. The grate is made of corrosion-resistant material such as chrome-plated nickel or stainless steel.

As can be seen best in FIGS. 5–7, each of the grate-supporting brackets 30 include an elongated generally L-shaped base 33 having a generally horizontal bottom wall 33a and a generally vertically extending side wall 33b. The front and rear of the base 33 are secured by screws 34 to, respectively, steps or posts 35 and 36 which are molded integrally with the end walls of the casing. Alternatively, suitable support brackets which are secured to the end walls may be used rather than the integrally molded posts 35 and 36. A grate-supporting channel 37 is supported above the base 33 by front and rear support legs 38 and 39, respectively. The lower end of the support leg 38 is pivotally secured to the side wall 33b of the base 33 by rivet 40, and the upper end of the support leg is pivotally secured to side wall 37a of the channel 37 by rivet 41. Similarly, the support leg 39 is pivotally secured to the base 33 and channel 37 by rivets 42 and 43, respectively. Each of the legs 38 and 39 are of equal length and are secured to the base 33 and channel 37 so that they are generally parallel.

The side wall 37a of each channel 37 is positioned adjacent the associated end wall of the casing, and side wall 37b of the channel lies inwardly of the wall 37a. The portion of the outer side wall 37a which is attached to the support legs 38 and 39 is seen to extend upwardly above the inner side wall 37b, and the side walls are joined by channel web or bottom 37c.

The cover 25 includes a generally L-shaped attaching bracket 44 secured by a screw 45 to a step or post 46 molded integrally with each of the end walls 25d and 25e of the top, and each of the attaching brackets 44 includes a relatively flat flange part 44a which is provided with a hole 44b.

Each of the brackets 30 is attached to the cover by means of a guide arm 47 which is pivotally secured at one end thereof to leg 39 by rivet 48. The opposite end of the guide arm 47 carries a pin 49 which extends from the guide arm toward the adjacent end wall of the top. The particular pin 49 illustrated extends from a back plate 50 through a suitable opening provided in the guide arm 47, and the back plate 50 is spot welded to the guide arm 47. The pin 49 is inserted through the opening 44b in the attaching bracket 44 and is secured against withdrawal by latch 51 which is pivotally secured to the outer surface of the guide arm 47 by rivet 52. As can be seen best in FIG. 6, the latch 51 is offset outwardly as at 51a a distance slightly greater than the thickness of the flange part 44a. The free end of the latch 51 is notched as at 51b, and the latch 51 may pivot toward the pin 49 so that the notched end 51b is hooked over the outer end of the pin, thereby securing the pin against withdrawal from the attaching bracket 44.

Each of the base rods 31 on each end of the warming grate 29 is received by one of the channels 37 and supported by the channel bottom 37c. Preferably, the height of the inner side walls 37b is approximately equal to or slightly less than the thickness of the base rod, and the cross rods 32 extend inwardly from the channels above the side wall 37b. The side wall 37b includes a pair of upwardly extending lugs 53 adjacent the ends thereof which extend between adjacent cross rods 32, and the length of the lugs is approximately equal to the spacing between the cross rods so that excessive forward and rearward movement of the grate is prevented.

OPERATION

Referring to FIG. 1, after the grill is started and the briquettes 17 have reached a suitable temperature, the food that is to be cooked, such as the steak 21, may be placed on the main grate 20, and the food that is to be warmed may be placed on the warming grate 29. When the top is raised as shown in FIGS. 1 and 2, the warming grate 29 is positioned well above and rearwardly of the central portion of the grate 20 and does not interfere with access to the main grill.

After the food is placed within the grill, the top may be closed. Referring to FIG. 3, as the top closes, the guide arm 47 of each bracket is pushed forwardly and causes the support leg 39 to pivot about its connection to the base 33. The base 33, channel 37, and support legs 38 and 39 are joined to form a parallelogram, and as the leg 39 swings about its connection to the base 33, the channel 37 swings inwardly toward the casing enclosure while remaining parallel to the base 33 and generally horizontal. The warming grate 29 also moves forwardly, the lugs 53 preventing any slipping between the grate and the channel. The grate is always maintained horizontally, and there is no danger that the food placed on the grate will spill or fall into the fire.

Figure 4:
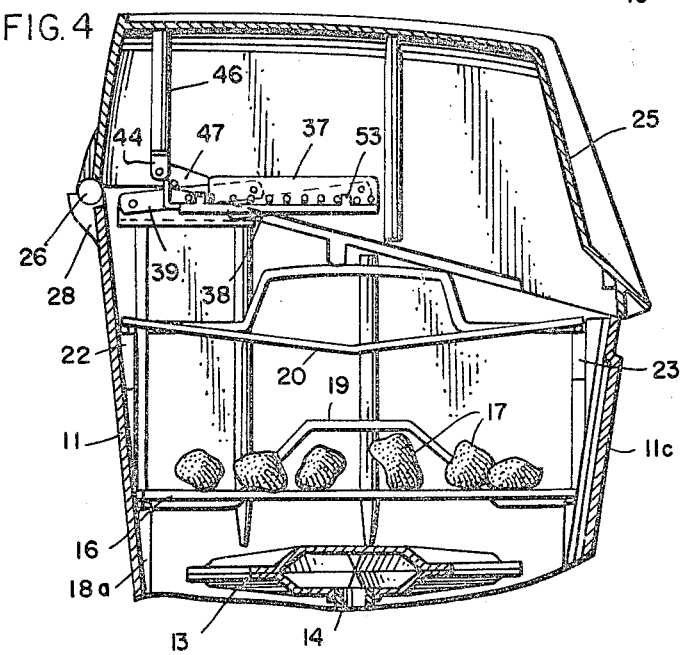
FIG. 4 is a view similar to FIGS. 2 and 3 showing the cover closed.

FIG. 4 illustrates the cover 25 in the completely closed position, and the support legs 38 and 39 extend almost horizontally toward the front of the casing, thereby positioning the grate 29 well toward the central portion of the casing enclosure and above the heat source. Referring to FIGS. 5–7, each of the legs 38 and 39 are offset inwardly as at 38a and 39a above the point of connection between the guide arm 47 and leg 39 to permit the bracket to collapse as the top is closed without interference between the rivet 48 and channel side wall 37a.

When the food that is being cooked on the main grate is to be removed or turned, the cover is lifted and the warming grate automatically swings upwardly and outwardly away from the main grate. Once again, the grate is always maintained generally horizontally.

When it is desired to replace the brackets 30 or when the cover 25 is to be removed for cleaning, the brackets 30 may be easily disengaged from the cover. Referring to FIGS. 7 and 8, the latch 51 is first pivoted upwardly away from the pin 49 about its connection 52 to the guide arm 47. The guide arm 47 may then be pushed away from the end wall of the casing a sufficient distance to remove the pin 49 from the opening 44b in the attaching bracket 44. It will be appreciated that the riveted connections between the guide arm 47 and the support leg 39 and between the support legs and the base are somewhat loose in order to permit relative rotation of these parts, and sufficient play is created in the bracket to permit the pin 49 to be withdrawn from the attaching bracket. Once the pin 49 is withdrawn, the bracket 30 may be swung forwardly away from the cover 25 as illustrated in FIG. 8, and the cover may be freely lifted from the casing 11. If it is desired to completely remove the brackets 30 from the grill, the screws 34 which secure the base 33 to the casing may be removed.

Although the guide arm 47 is shown as being connected to support leg 39, it may also be pivotally connected directly to the channel 37. The brackets may be made of any suitable metal which is relatively corrosion-resistant and which may be easily cleaned, such as stainless steel.

While in the foregoing specification, I have described a specific embodiment of my invention in considerable detail for the purpose of illustration, it is to be understood that many of the details herein given may be varied considerably by those skilled in the art without departing from the spirit and scope of the invention.

I claim:

1. A grate-supporting bracket for use in a grill having a casing providing a cooking enclosure and a top hingedly connected to the casing, said bracket including an elongated base adapted to be secured to the casing, an elongated grate support, a pair of elongated leg supports, one end of each leg support being pivotally secured to the grate support and the other end of each leg support being pivotally secured to the base, said leg supports being of substantially equal length and extending generally parallel with each other whereby said base and said grate support are maintained substantially parallel, and an elongated guide arm having a pair of ends, one of said arm ends being pivotally secured to the bracket and the other arm end being adapted for pivotal attachment to the top.

2. The structure of claim 1 including a latch pivotally secured to said guide arm, a transversely extending pin on said arm adapted to be inserted through an attaching bracket on said top, said latch being engageable with said pin to prevent withdrawal of the pin from the attaching bracket.

3. In a cooking grill having a casing providing a cooking enclosure and a top hingedly connected to said casing, a grate and bracket assembly including a generally planar grate and a pair of grate-supporting brackets, each of said brackets having (a) a generally horizontally extending elongated base secured to said casing, (b) a generally horizontally extending elongated grate support above the base, (c) a pair of elongated leg supports, one end of each leg support being pivotally secured to said grate support and the other end of each leg support being pivotally secured to said base, said leg supports being of substantially equal length and extending generally parallel with each other, (d) and an elongated guide arm having a pair of ends, one of said arm ends being pivotally secured to said top and the other of said arm ends being pivotally secured to one of said leg supports, said grate being supported by said grate-support brackets and being maintained generally horizontally while said top moves with respect to said casing.

4. The structure of claim 3 wherein said assembly includes a pair of attaching brackets secured to said top, each of said grate-supporting brackets including a latch pivotally secured to said guide arm and a pin on the guide arm, each of said pins being inserted through an opening provided in one of said attaching brackets, each latch being releasably engaged with the associated pin to prevent withdrawal of the pin from the attaching bracket.

5. The structure of claim 3 wherein said grate-support brackets are generally channel-shaped and include a pair of spaced-apart side walls and a bottom, each pair of said support legs being pivotally secured to one of the side walls, said grate being supported by the channel bottoms of said grate-support brackets.

6. The structure of claim 3 wherein said assembly includes a pair of attaching brackets secured to said top, each of said grate-supporting brackets including a latch pivotally secured to said guide arm and having a notched end, each guide arm including a pin extending through an opening provided in the associated attaching bracket, the notched end portion of each latch being spaced transversely from the associated guide arm a distance slightly greater than the thickness of the attaching brackets and engaging one of said pins to prevent withdrawal of the pin from the associated attaching bracket.

7. The structure of claim 3 wherein said grate-supporting brackets are generally channel-shaped and include a pair of spaced-apart side walls and a bottom, each pair of said support legs being pivotally secured to one of the side walls, each of the other of said side walls of the grate-supporting brackets including an upwardly extending lug, said grate including a plurality of cross rods extending from one bracket to the other, each of said lugs extending upwardly between two adjacent cross rods.

References Cited

UNITED STATES PATENTS

| | | | |
|---|---|---|---|
| 2,149,114 | 2/1939 | Constantine. | |
| 2,265,421 | 12/1941 | Donnelly | 126—338 X |
| 3,298,361 | 1/1967 | Clark | 126—25 |

FOREIGN PATENTS

| | | |
|---|---|---|
| 420,739 | 12/1934 | Great Britain. |

CHARLES J. MYHRE, Primary Examiner

U.S. Cl. X.R.

126—334